United States Patent [19]

Ohmi et al.

[11] Patent Number: 5,739,995
[45] Date of Patent: *Apr. 14, 1998

[54] DETACHABLE MAGNETIC DISK APPARATUS

[75] Inventors: Takao Ohmi, Kamakura; Shigeru Takekado, Tokyo-To, both of Japan

[73] Assignee: Kabushiki Kaisha Toshiba, Kawasaki, Japan

[*] Notice: The portion of the term of this patent subsequent to Oct. 25, 2011, has been disclaimed.

[21] Appl. No.: 281,111

[22] Filed: Jul. 28, 1994

Related U.S. Application Data

[63] Continuation of Ser. No. 862,205, Apr. 2, 1992, Pat. No. 5,359,504.

[30] Foreign Application Priority Data

Apr. 3, 1991 [JP] Japan ..................... 3-70728

[51] Int. Cl.⁶ .................................................. G11B 23/03
[52] U.S. Cl. ........................... 360/137; 360/69; 364/708.1
[58] Field of Search .............................. 360/69, 97.02, 360/99.09, 137, 77.02; 369/75.1; 364/708.1

[56] References Cited

U.S. PATENT DOCUMENTS

| | | | |
|---|---|---|---|
| 4,639,863 | 1/1987 | Harrison et al. | 364/708 |
| 4,769,764 | 9/1988 | Levanon | 364/708 |
| 4,833,554 | 5/1989 | Dalziel et al. | 360/75 |
| 4,853,807 | 8/1989 | Trager | 360/97.01 |
| 4,893,263 | 1/1990 | Myers | 364/708 |
| 4,908,715 | 3/1990 | Krum et al. | 360/97.02 |
| 5,041,924 | 8/1991 | Blackborow et al. | 360/137 |
| 5,084,791 | 1/1992 | Thanos et al. | 360/902 X |
| 5,204,794 | 4/1993 | Yoshida | 360/137 |
| 5,241,436 | 8/1993 | Kawabata et al. | 360/137 |
| 5,359,504 | 10/1994 | Ohmi et al. | 360/137 |
| 5,448,433 | 9/1995 | Morehouse et al. | 360/97.02 |

FOREIGN PATENT DOCUMENTS

| | | |
|---|---|---|
| 0 204 299 | 12/1986 | European Pat. Off. . |
| 0 335 490 | 10/1989 | European Pat. Off. . |
| 2 228 819 | 9/1990 | European Pat. Off. . |
| 0 426 414 | 5/1991 | European Pat. Off. . |
| S62-259284 | 11/1987 | Japan . |
| H01-189091 | 7/1989 | Japan . |
| 2 243 940 | 11/1991 | United Kingdom . |

*Primary Examiner*—Aristotelis M. Psitos
*Assistant Examiner*—Larry T. Cullen
*Attorney, Agent, or Firm*—Foley & Lardner

[57] ABSTRACT

A magnetic disk apparatus is disclosed wherein the apparatus comprises a magnetic disk, magnetic heads for recording and reproducing information to and from the magnetic disk, a disk driving device for driving the magnetic disk, head driving device for driving the magnetic heads, a mechanical portion driving circuit for operating the disk driving device and the head driving device, a logical operation device for exchanging signals between the magnetic heads and the mechanical portion driving circuit, a first box for containing at least the magnetic disk, the magnetic heads, the disk driving device, and the head driving device, and a second box, detachably connected to the first box, for containing at least the logical operation device, wherein signals are exchanged between the first box and the second box. The first box and the second box are electrically connected and the second box contains at least the logical operation circuit.

7 Claims, 14 Drawing Sheets

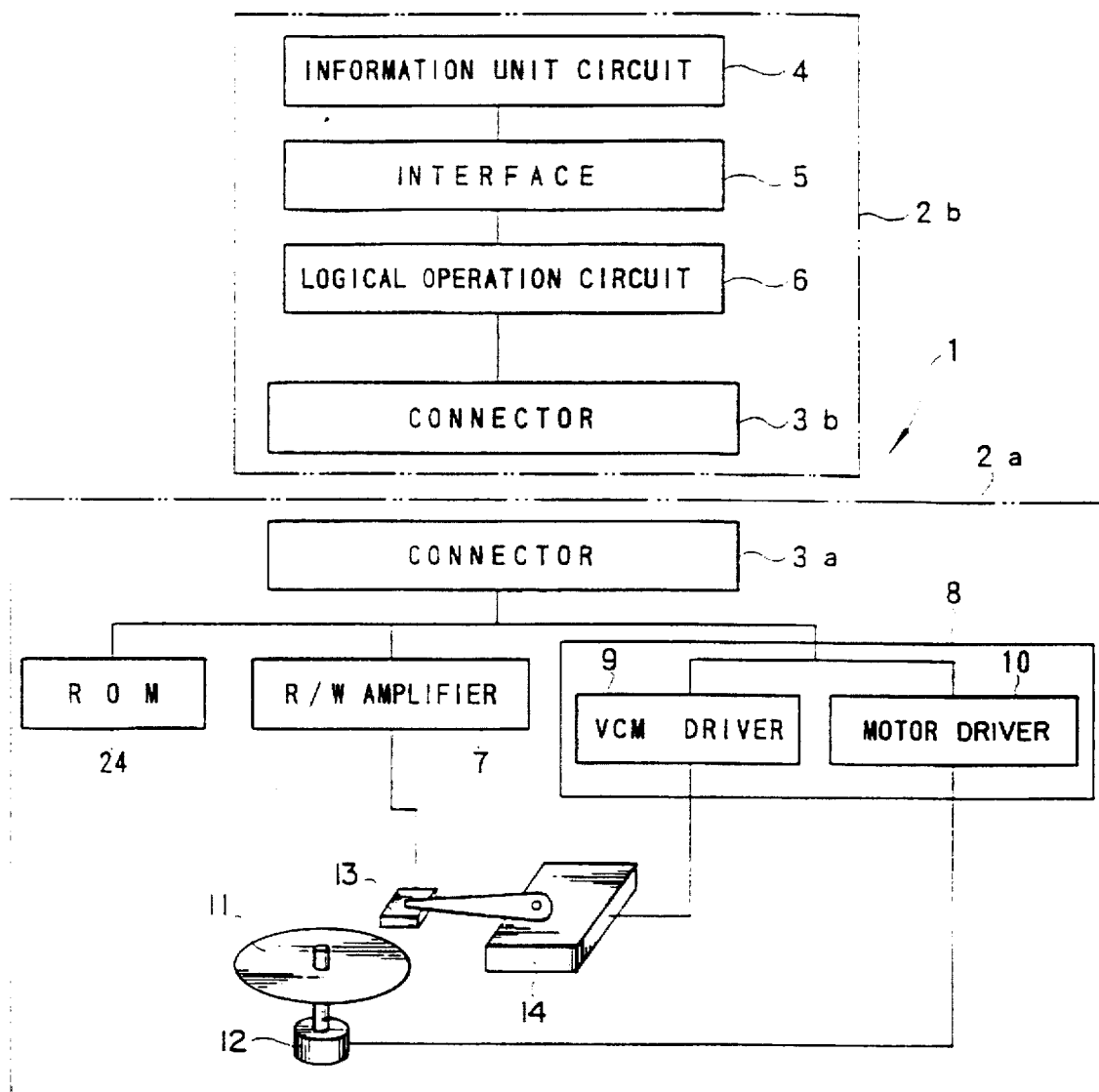
F I G . 1

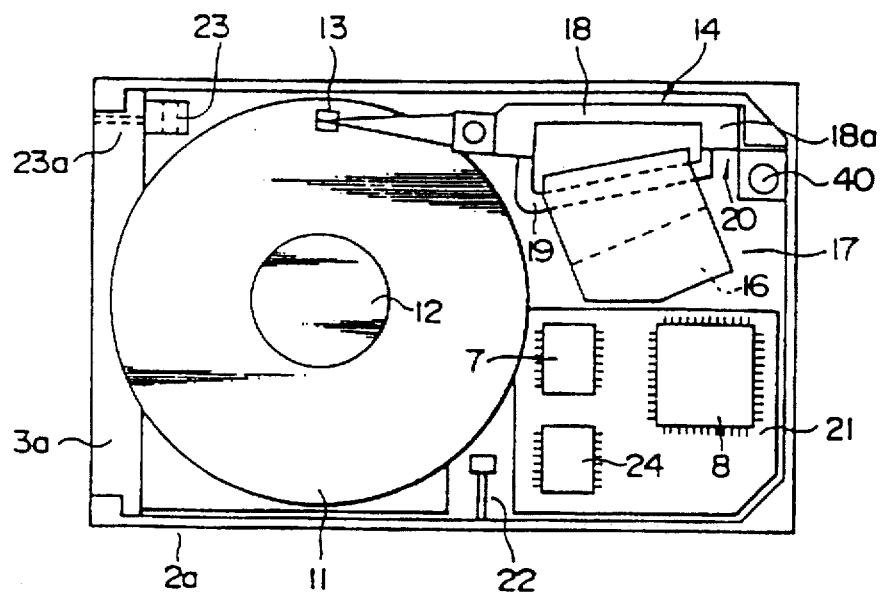
F I G . 2(a)
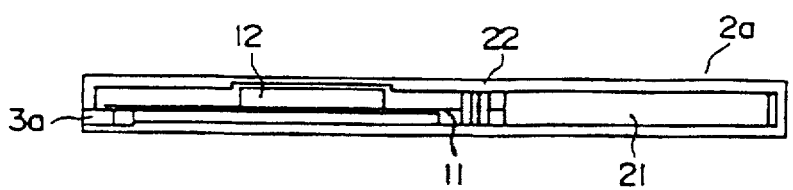
F I G . 2(b)

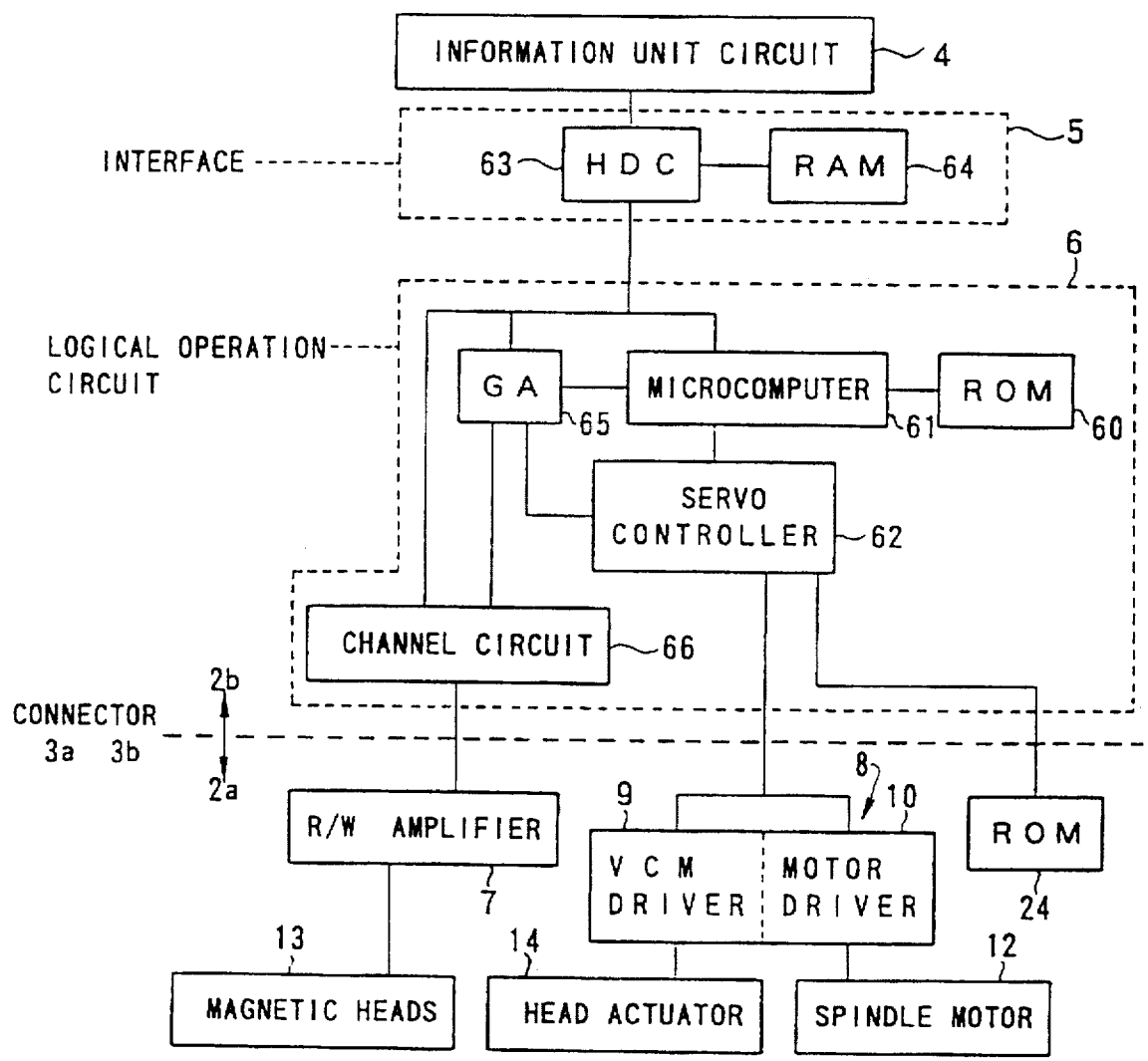
F I G. 3

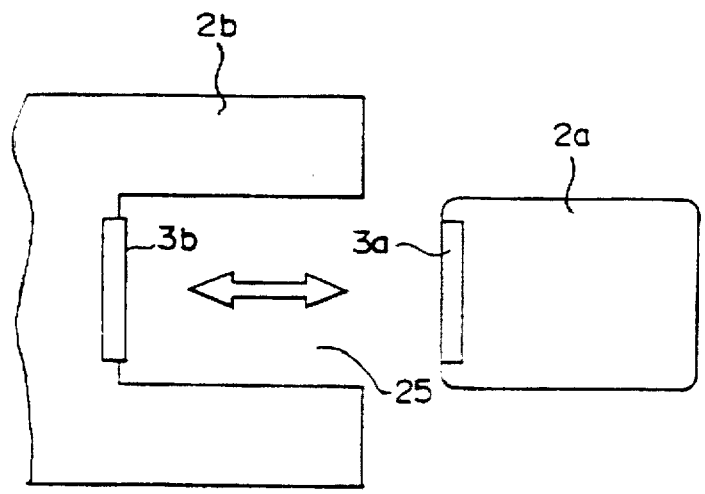
F I G . 4(a)
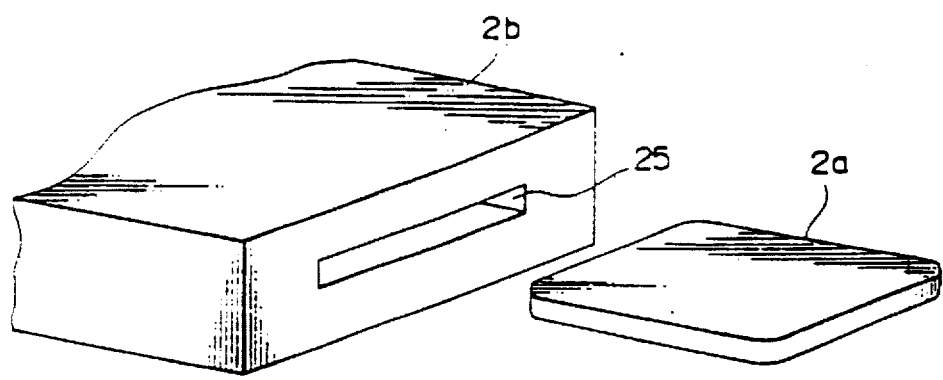
F I G . 4(b)

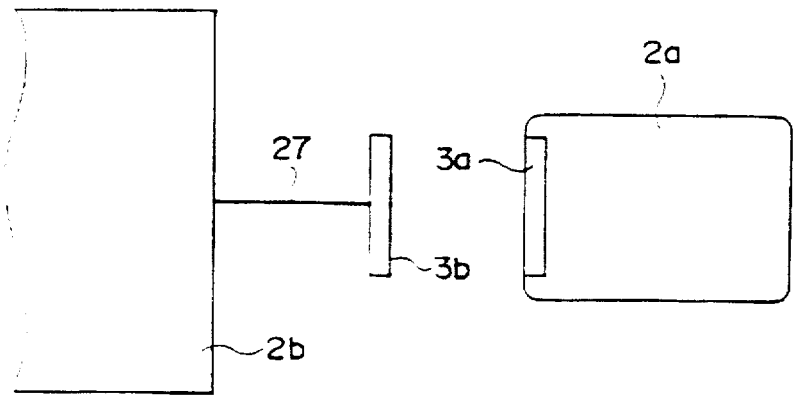
F I G. 6(a)
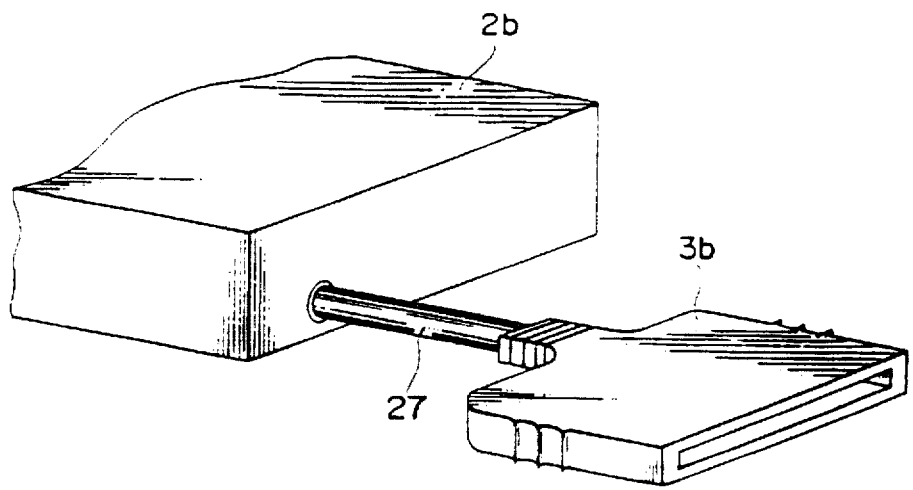
F I G. 6(b)

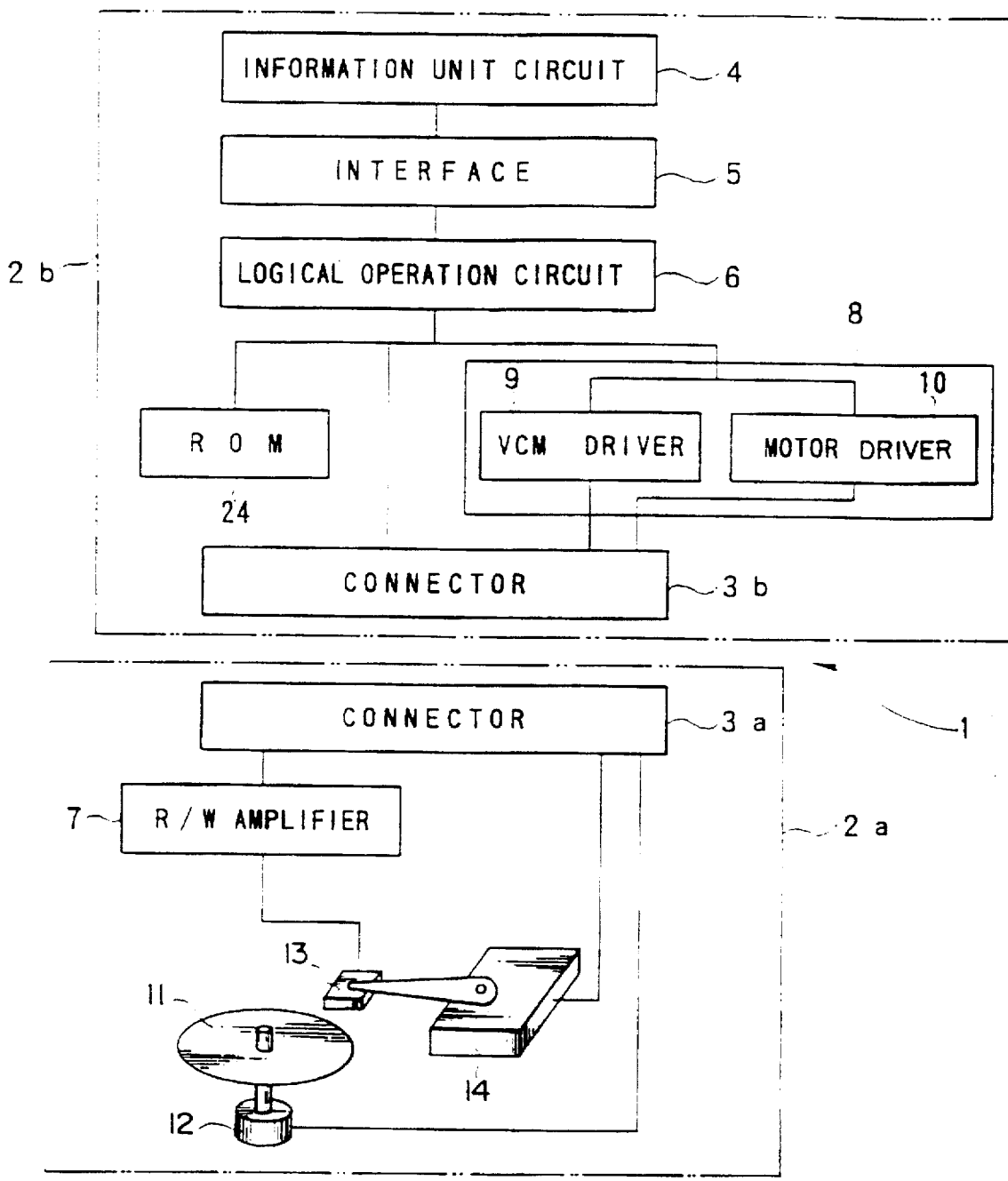
F I G . 9

5,739,995

DETACHABLE MAGNETIC DISK APPARATUS

This application is a continuation of application Ser. No. 07/862,205, filed Apr. 2, 1992, now U.S. Pat. No. 5,359,504.

BACKGROUND OF THE INVENTION

The present invention relates to a magnetic disk apparatus which is mounted in or on a personal computer or the like and, in particular, relates to a magnetic disk apparatus with improved portability.

A conventional magnetic disk apparatus mounted in a personal computer or the like comprises a magnetic disk and magnetic heads which record and reproduce information on and from the magnetic disk. The magnetic disk and the magnetic heads are driven by a disk driving means and a head driving means, respectively. In addition, the magnetic heads are connected to an electronic circuit which reproduces information as an electric signal. The mechanical parts such as the magnetic disk, the magnetic heads, the disk driving means, and so forth, and the electric circuits are contained compactly in the same box so as to reduce the size of the magnetic disk apparatus. In another construction, the mechanical parts are contained in a box, and a board which supporting electric circuits is secured to the box so as to reduce the size of the magnetic disk apparatus.

The small magnetic disk apparatus in such a construction is mounted in a personal computer which exchanges information therewith. When the magnetic disk apparatus is detachable from the personal computer, they can be independently handled. Thus, the design work and mounting work of the personal computer and the magnetic disk apparatus can be simplified.

However, as the size and the weight of the magnetic disk apparatus is reduced, its portability is becoming an important issue and thereby the following problems arise.

When the mechanical parts and the electric circuits are contained in the same box, since the number of component parts contained therein increases, the size and the weight of the overall magnetic disk apparatus cannot be satisfactorily reduced. Thus, the portability of the magnetic disk apparatus cannot be improved. In addition, even if the mechanical parts and the electric circuits are mounted in the same box with high density, heat generated from the electric circuits adversely affects the mechanical parts. Moreover, electromagnetic noise generated by the mechanical parts may cause the electric circuits to malfunction.

As described above, to reduce the size and the weight of the conventional magnetic disk apparatus, there are problems with respect to the number of the constituting parts, heat generation, and generation of electromagnetic noise. However, it is difficult to solve such problems by a design change of the magnetic disk apparatus.

The present invention has been made in view of the above described problems. An object of the present invention is to provide a magnetic disk apparatus for preventing the electric circuits from malfunctioning due to heat generated in the box and for further improving the portability thereof.

SUMMARY OF THE INVENTION

The present invention provides a magnetic disk apparatus comprising a magnetic disk, magnetic heads for recording and reproducing information to and from the magnetic disk, a disk driving means for driving the magnetic disk, a head driving means for driving the magnetic heads, a mechanical portion driving circuit for operating the disk driving means and the head driving means, a logical operation means for exchanging signals between the magnetic heads and the mechanical portion driving circuit, a first box for containing at least the magnetic disk, the magnetic heads, the disk driving means, and the head driving means, and a second box, detachably connected to the first box, for containing at least the logical operation means, wherein signals are exchanged between the first box and the second box.

According to the present invention, since the number of electric circuit devices contained in the first box is decreased, the size of the first box can be reduced and the portability can be improved. In addition, since heat generated by the electric circuits in the first box can be decreased, deleterious effects on the component parts such as the magnetic heads contained in the first box can be reduced. Moreover, since the structural parts such as the spindle motor are contained in the first box and the logical operation circuit is contained in the second box, the logical operation circuit can be effectively prevented from being affected by electromagnetic noise generated by the mechanical parts.

BRIEF DESCRIPTION OF THE DRAWINGS

FIG. 1 is a block diagram showing an example of organization of a magnetic disk apparatus in accordance with a first embodiment of the present invention;

FIGS. 2(a) and 2(b) are plan views and side views showing an example of the interior arrangement of a first box which contains a magnetic disk in accordance with the first embodiment of the present invention;

FIG. 3 is a block diagram indicating a signaling process between the interior of the first box and the interior of a second box in accordance with the first embodiment of the present invention;

FIGS. 4(a) and 4(b) are plan views and perspective views showing a construction of connections between the first box and the second box in accordance with the first embodiment of the present invention;

FIGS. 6(a) and 6(b) are plan views and perspective views showing a further construction of connections between the first box and the second box in accordance with the first embodiment of the present invention;

FIG. 9 is a block diagram showing a construction of a magnetic disk apparatus in accordance with a third embodiment of the present invention;

Figure 5A:
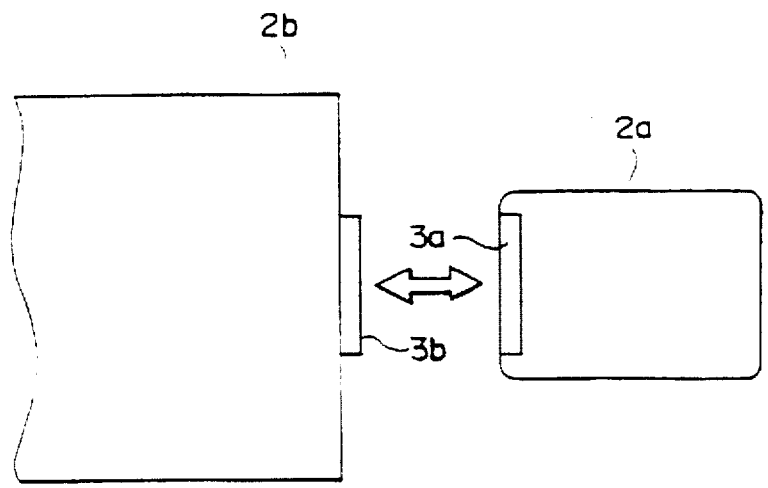
FIGS. 5(a) and 5(b) are plan views and perspective views showing another construction of connections between the first box and the second box in accordance with the first embodiment of the present invention.

DESCRIPTION OF THE PREFERRED EMBODIMENTS (First embodiment)

With reference to the accompanying drawings, embodiments according to the present invention will be described in detail. FIGS. 1 to 6(b) are schematic and block diagrams showing a magnetic disk apparatus in accordance with a first embodiment of the present invention.

In FIG. 1, a magnetic disk apparatus 1 comprises a first box 2a and a second box 2b. The first box 2a contains a magnetic disk. The second box 2b which is detachable from the first box 2a contains a logical operation circuit. The first box 2a is provided with a first connector 3a. By connecting the first connector 3a to a second connector 3b of the second box 2b, signals are exchanged between the interior of the first box 2a and the interior of the second box 2b, the magnetic disk apparatus 1 thereby operating.

Figure 11:
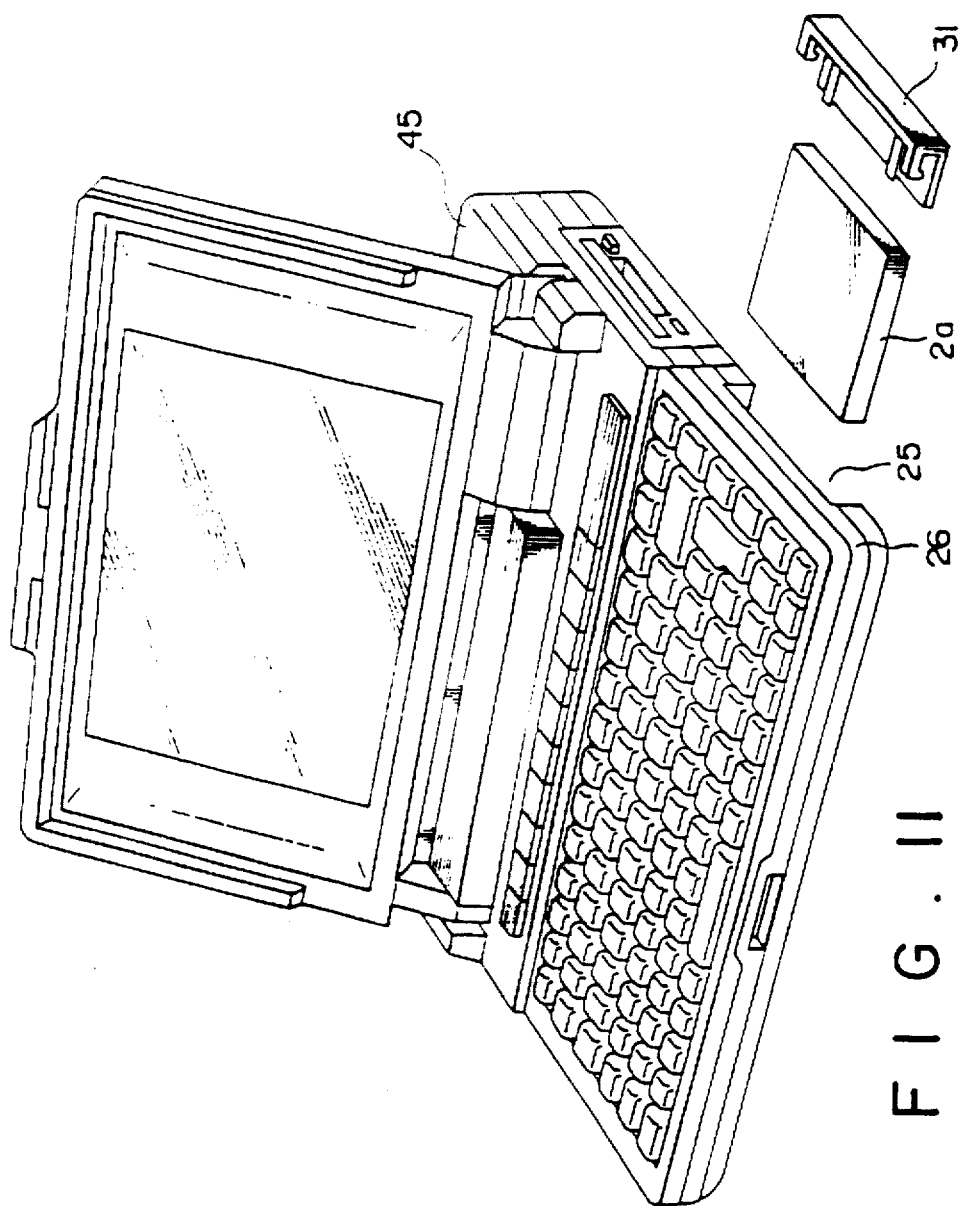
FIG. 11 is a plan view and a perspective view showing a construction of connections between a first box and a second box in accordance with a fourth embodiment of the present invention.

The second box 2b is mounted in a personal computer main body 45 (see FIG. 11). By separating the first box 2a from the second box 2b, only the first box 2a can be detached from the personal computer main body 45. The second box 2b can be detachably or firmly mounted in the personal computer main body 45.

The second box 2b contains semiconductor parts such as an information unit circuit 4, an interface 5, a logical operation circuit 6 (logical operation means), and so forth. The logical operation circuit 6 is connected to the second connector 3b.

On the other hand, the first box 2a contains semiconductor parts and mechanical parts. The semiconductor parts are a read/write amplifier (R/W amplifier) 7, a mechanical portion driving circuit 8, a ROM (read only memory) 24, and so forth. The mechanical parts are a magnetic disk 11, a spindle motor (disk driving means) 12, magnetic heads 13, a head actuator 14 (head driving means), and so forth.

The ROM 24 stores information specific to the individual parts contained in the first box 2a. The information includes the storage capacity and the number of tracks of the magnetic disk 11; the number of magnetic heads 13; the format type of the magnetic disk 11; the signal transfer rate of the magnetic heads 13; and the motor constants, resistances, and inductances of the spindle motor 12 and the head actuator 14. Hereinafter, this information is referred to as "specific information".

The mechanical portion driving circuit 8 comprises a VCM (Voice Coil Motor) driver 9 and a motor driver 10. The VCM driver 9 drives the head actuator 14. The motor driver 10 drives the spindle motor 12.

FIGS. 2(a) and 2(b) show the inner construction of the first box 2a which contains a magnetic disk 11, where FIG. 2(a) is a plan view thereof and FIG. 2(b) is a side view thereof. In FIGS. 2(a) and 2(b), the same structural elements as those in FIG. 1 are designated by the same reference numerals and their detail description is omitted.

As shown in FIGS. 2(a) and 2(b), each structural part is securely contained in the first box 2a. The shape of the first box 2a is substantially the same as that of a magnetic card or an intergrated circuit (IC) card. The thickness of the first box 2a is in the range of from approximately 4 mm to 9 mm inclusive.

When information is recorded or reproduced, the magnetic disk 11 is rotated by the spindle motor 12 counterclockwise (see FIG. 2(a)). The magnetic disk 11 is sandwiched by the two magnetic heads 13. These magnetic heads 13 are positioned in the radius direction of the magnetic disk 11 by the head actuator 14 so as to accurately access desired information. A positioning control signal for the head actuator 14 is supplied from the VCM driver 9.

As shown in FIG. 2(a), the head actuator 14 comprises a permanent magnet 16 horizontally disposed, a pair of yokes 17, 17 oppositely disposed for vertically sandwiching the permanent magnet 16 and for forming a magnetic circuit, and a coil 19 disposed between the yokes 17, 17. The magnetizing direction of the permanent magnet 16 is the direction perpendicular to the paper surface of FIG. 2(a). The winding surface of the coil 19 is a surface in parallel with the paper surface of FIG. 2(a). In addition, a part of the coil 19 is secured to the head arm 18. A base portion 18a of the head arm 18 is mounted on a column 40 secured to the first box 2a through a cross-shaped leaf spring 20 so that the head arm 18 can be horizontally pivoted around the column 40. Alternatively, the base portion 18a can be mounted to the column 40 with a pivot using a ball bearing rather than the cross-shaped leaf spring 20.

The semiconductor parts such as the R/W amplifier 7, the mechanical portion driving circuit 8, and the ROM 24 are mounted on the mount portion 21 secured to the inside of the first box 2a.

The first box 2a is provided with a circulation filter 22 for the filtrating air therein. In a corner of the first box 2a, a respiration filter 23 is disposed. On a wall of the first box 2a, an air vent 23a connected to the respiration filter 23 is provided.

An information processing operation of the magnetic disk apparatus is carried out as follows with the above described embodiment.

First, the first box 2a is connected through the connectors 3a and 3b to the second box 2b mounted in the personal computer main body 45 (see FIG. 11).

In this case, specific information such as the storage capacity and format of the magnetic disk 11 contained in the first box 2a is stored in the ROM 24, read to the logical operation circuit 6 in the second box 2b, and then sent to the interface 5.

The information unit circuit 4 which is disposed in the second box 2b is connected to a keyboard, a mouse, and so forth of the personal computer main body 45. An information signal which is supplied from the information unit circuit 4 is converted into a particular signal pattern for use in the magnetic disk apparatus 1 by the interface 5. The converted information signal is sent to the logical operation circuit 6.

The logical operation circuit 6 generates a timing clock for use in reading and writing information from and to the magnetic disk 11. The logical operation circuit 6 processes the information in accordance with the clock and exchanges the processed information with the R/W amplifier 7. In addition, the logical operation circuit 6 exchanges a control signal with the mechanical portion driving circuit 8 disposed in the first box 2a so as to rotate the magnetic disk 11 and move the magnetic heads 13. Thus, the logical operation circuit 6 positions the magnetic heads to a desired track and a desired sector.

The R/W amplifier 7 adjusts the amount of the signal current so that information is written by the magnetic heads 13 on the magnetic disk 11 with a suitable magnetic force in accordance with the floating height of the magnetic heads 13 and the variation of peripheral speeds at the inner periphery and the outer periphery of the magnetic disk 11.

The signal which is supplied to the mechanical portion driving circuit 8 is branched to the VCM driver 9 and the motor driver 10. The signal which is supplied to the VCM driver 9 is supplied to the head actuator 14. With this signal, the head actuator 14 is driven. In accordance with the signal which is supplied to the motor driver 10, a spindle motor driving current is supplied to the spindle motor 12. With this current, the spindle motor 12 is rotated.

An information signal reproduced by the magnetic heads 13 from the magnetic disk 11 is amplified by the R/W amplifier 7. The information signal is supplied to the second box 2b through the connectors 3a and 3b. Thereafter, the information signal is compensated to a proper value by the logical operation circuit 6. Thereafter, the compensated signal is converted into a signal which is supplied to the interface 5. The interface 5 separates an information signal and a control signal from the received signal. The separated signals are sent to the information unit circuit 4. The information signal is read by the logical operation circuit 6 of the second box 2b in accordance with the control signal.

In the above described construction according to the present invention, while the overall function of the conventional magnetic disk apparatus is provided, the first box 2a which contains the magnetic disk 11 can be separated from the second box 2b mounted in the personal computer main body 45. Thus, the size and the weight of the detachable portion, that is the first box 2a, can be reduced and the portability thereof can be improved.

In addition, since the electric circuits such as the logical operation circuit 6 and so forth are disposed in the second box 2b, the number of electric circuit devices contained in the first box 2a which contains the magnetic disk 11 can be minimized. Thus, the portability of the first box 2a which contains the magnetic disk 11 can be improved. In addition, since heat generated by the electric circuits can be decreased, adverse effect on the mechanical parts such as the spindle motor 12 can be effectively prevented. Moreover, since the electric circuits are not affected by electromagnetic noise generated by the mechanical parts such as the spindle motor 12, the possibility of malfunctioning of the electric circuits can be decreased. Thus, parts can be mounted with high density in the first box 2a which contains the magnetic disk 11.

Furthermore, since the logical operation circuit 6 is disposed in the second box 2b, deleterious effect of high frequency noise generated by the logical operation circuit 6 on a storage (or write) current of the magnetic heads 13 can be decreased. In addition, although the conventional logical operation circuit 6 is comprises an IC device such as CMOS device which is easily affected by static electricity, since the logical operation circuit 6 is contained in the second box 2b different from the first box 2a which contains the magnetic disk 11, trouble such as electrostatic breakage can be prevented.

Moreover, since the first box 2a which contains the magnetic disk 11 is connected to the second box 2b mounted in the personal computer main body 45 through the connectors 3a and 3b, another first box 2a can be easily connected to the second box 2b. Furthermore, when information is sorted by using a plurality of first boxes 2a, they can be used like conventional magnetic cards or IC cards.

In FIG. 1, the VCM driver 9 and the motor driver 10 can be constituted of one IC device. The IC device can be operated as the mechanical portion driving circuit 8. Likewise, a plurality of other component parts can be constituted of one IC device.

With reference to FIG. 3, a signaling process performed between the interior of the first box 2a and the interior of the second box 2b will be described in detail.

The ROM (read only memory) 60 of the logical operation circuit 6 disposed in the second box 2b stores position controlling information for positioning the magnetic heads 13 at a particular position on the magnetic disk 11. In accordance with this information, a microcomputer 61 issues a command to a servo controller 62. The servo controller 62 supplies a control signal to the mechanical portion driving circuit 8 which comprises the motor driver 10, the VCM driver 9, and so forth so as to drive the spindle motor 12 and the head actuator 14.

A data signal such as a text file received from the information unit circuit 4 in accordance with SCSI or PC/AT interface bus system is stored in a RAM (random access memory) 64, which is a rewritable storage device, through a HDC (hard disk controller) 63 of the interface 5. The HDC 63 controls the bus and corrects any errors. Data stored in the RAM 64 is transferred to a GA (gate array) 65 under control of the microcomputer 61 of the logical operation circuit 6. The data is converted into a code string suitable for magnetic recording. The data code converted by the GA 65 is converted into a data waveform suitable for magnetic recording by a channel circuit 66. The resultant data is supplied to the R/W amplifier 7 disposed in the first box 2a. A current in accordance with the data waveform is supplied from the R/W amplifier 7 to the magnetic heads 13, and the data is written on a side of the magnetic disk 11 in accordance with a head selection signal.

Data recorded on the magnetic disk 11 is sent to the information unit circuit 4 of the second box 2b in a manner which is the reverse of the above described recording operation. In other Words, a signal waveform being read by the magnetic heads 13 is amplified by the R/W amplifier 7. The amplified signal is sent to the channel circuit 66. The channel circuit 66 compensates the signal amplitude to a suitable size and performs a coding process. The signal received from the channel circuit 66 is sent to the GA 65 in synchronization with the reference signal generated by the microcomputer 61. Thereafter, the signal received from the GA 65 is sent to the HDC 63 under control of the microcomputer 61. Thereafter, the signal received from the HDC 63 is stored in the RAM 64. Thereafter, the signal stored in the RAM 64 is transferred to the information unit circuit 4 in accordance with the interface bus system.

Examples of connections between the first box 2a and the second box 2b will now be described in detail. FIGS. 4(a), 4(b), 5(a), 5(b), 6(a), and 6(b) are schematic diagrams showing examples of connections between the first box 2a and the second box 2b. As shown in FIGS. 4(a) and 4(b), the first box 2a is connected to the second box 2b mounted in the personal computer main body 45 (see FIG. 11). In FIGS. 4(a) and 4(b), the shape of the first box 2a which contains the magnetic disk 11 is nearly the same as that of a conventional magnetic card or a conventional IC card.

As shown in FIGS. 4(a) and 4(b), a concave space 25 is formed in a part of the second box 2b. By inserting the first box 2a into the space 25, the first connector 3a of the first box 2a is connected to the second connector 3b of the second box 2b. The second connector 3b is secured to the second box 2b.

Figure 5B:
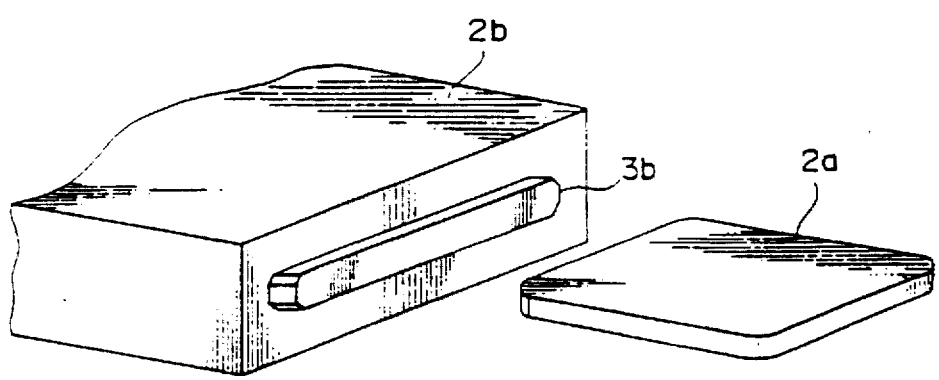

FIGS. 5(a) and 5(b) show another construction of the connections between the first box 2a and the second box 2b. As shown in the figures, the second connector 3b projects outward from the outer surface of the second box 2b. The second connector 3b of the second box 2b is connected to the first connector 3a of the first box 2a.

FIGS. 6(a) and 6(b) show a further construction of the connections between the first box 2a and the second box 2b. As shown in FIGS. 6(a) and 6(b), the second connector 3b is disposed at the outer end of a connector cable 27 extended outward from the second box 2b. The second connector 3b of the second box 2b is connected to the first connector 3a of the second connector 3b.

(Second embodiment)

Figure 7:
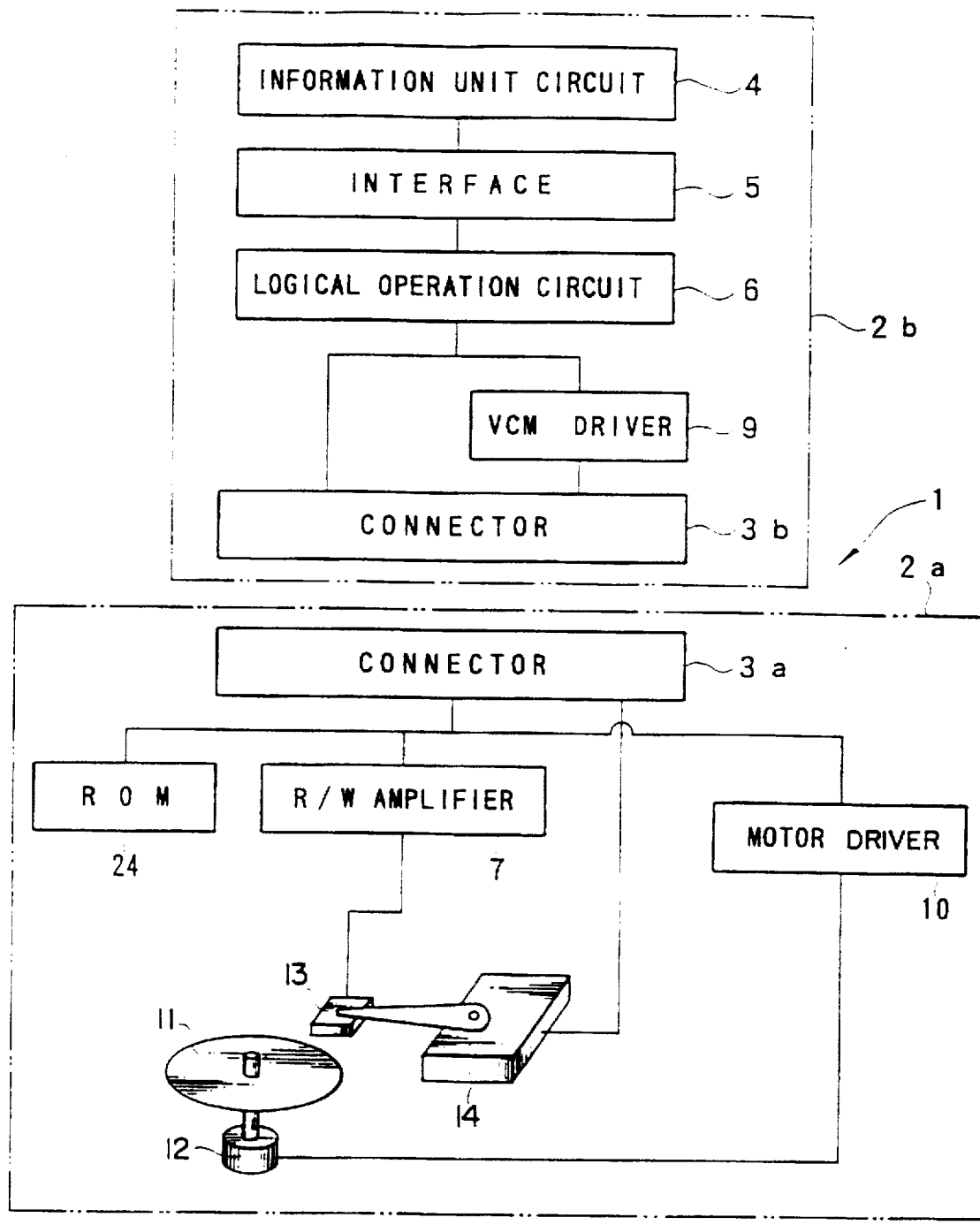
FIG. 7 is a block diagram showing a construction of a magnetic disk apparatus in accordance with a second embodiment of the present invention.
Figure 8A:
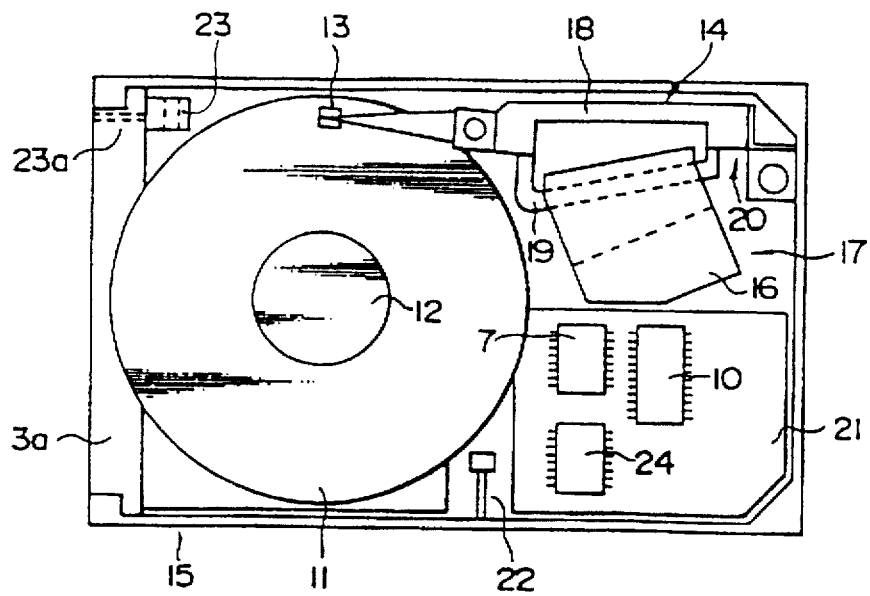
FIGS. 8(a) and 8(b) are plan views and side views showing an example of the interior arrangement of a first box which contains a magnetic disk in accordance with the second embodiment of the present invention.
Figure 8B:
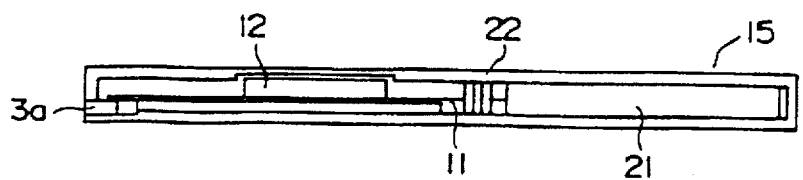

With reference to FIGS. 7,8(a), and 8(b), a magnetic disk apparatus in accordance with a second embodiment of the present invention will be described. In FIGS. 7,8(a) and 8(b), the same parts as those in the first embodiment are designated by the same reference numerals, and their detailed description will be omitted.

FIG. 7 is a block diagram of a magnetic disk apparatus in accordance with the second embodiment of the present invention. FIG. 8(a) is a plan view showing the internal construction of a first box 2a which contains a magnetic disk 11. FIG. 8(b) is a side view of the first box 2a.

In this embodiment, a VCM driver 9 is disposed in the second box 2b, and a motor driver 10 is disposed in the first box 2a, unlike the first embodiment.

According to this second embodiment, the number of electric circuit devices mounted in the first box 2a can be further decreased. Thus, the size and the weight of the first box 2a detachable from a personal computer main body 45 can be further reduced while the same function as the first embodiment is provided.

(Third embodiment)

Figure 10A:
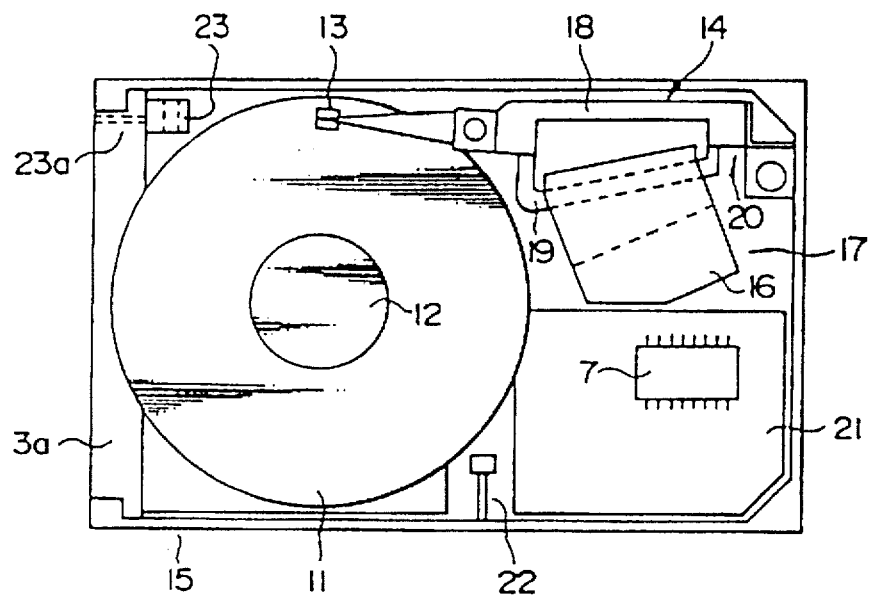
FIGS. 10(a) and 10(b) are plan views and side views showing an interior arrangement of a first box which contains a magnetic disk in accordance with the third embodiment of the present invention.
Figure 10B:
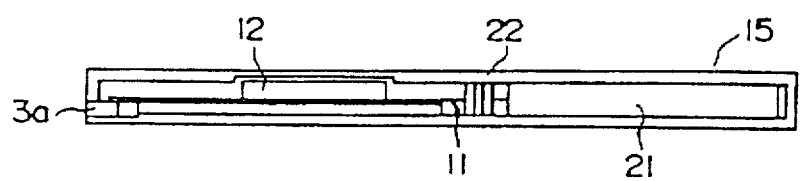

With reference to FIGS. 9,10(a) and 10(b) a magnetic disk apparatus in accordance with a third embodiment of the present invention will be described. In FIGS. 9,10(a) and 10(b) the same parts as those in the first embodiment are designated by the same reference numerals, and their detailed description will be omitted.

FIG. 9 is a block diagram of a magnetic disk apparatus in accordance with the third embodiment of the present invention. FIG. 10(a) is a plan view showing the internal construction of a first box 2a which contains a magnetic disk 11. FIG. 10(b) is a side view of the first box 2a.

In this embodiment, a mechanical portion driving circuit 8 which comprises a VCM driver 9 and a motor driver 10, and a ROM 24 are disposed in a second box 2b unlike the first embodiment. In this third embodiment, since the VCM driver 9 and the motor driver 10 are composed of one IC device (package) in common, this IC device operates as the mechanical portion driving circuit 8.

According to this third embodiment, the number of electric circuit devices accommodated in the first box 2a which contains the magnetic disk 11 can be further remarkably decreased. Thus, the size and the weight of the first box 2a detachable from the personal computer main body 45 can be further reduced while the same function as in the first embodiment and the second embodiment is provided.

(Fourth embodiment)

Figure 12:
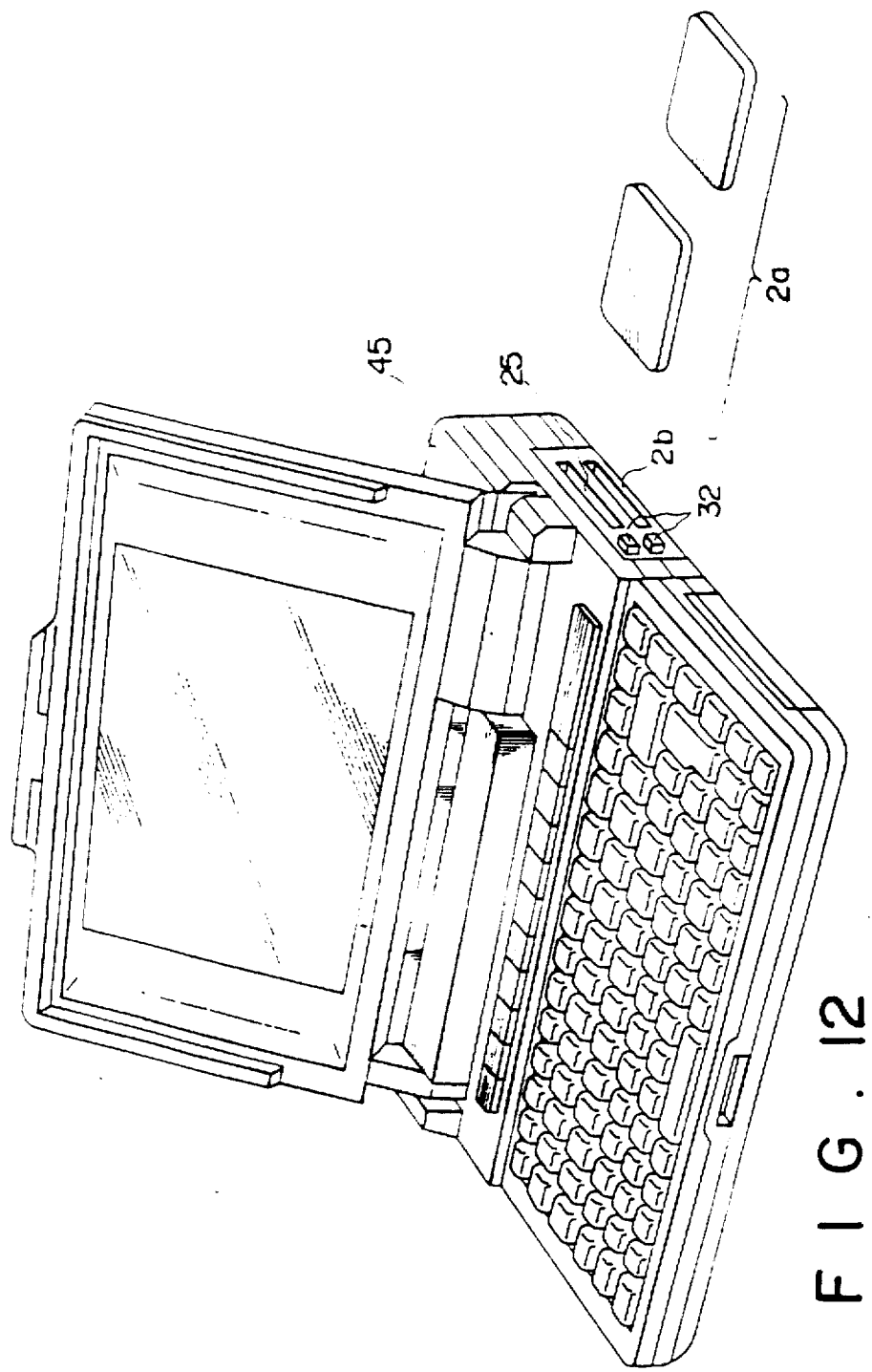
FIG. 12 is a plan view and a perspective view showing another construction of connections between the first box and the second box in accordance with the fourth embodiment of the present invention.

With reference to FIGS. 11 and 12, a magnetic disk apparatus in accordance with a fourth embodiment will be described. In FIGS. 11 and 12, the same parts as those in the first embodiment as designated by the same reference numerals and their detailed description will be omitted.

FIG. 11 is a perspective view showing the construction of connections between a first box 2a and a second box 2b. As shown in the figure, the second box 2b is mounted in a personal computer main body 45. The first box 2a is inserted into a concave portion 25 formed in the second box 2b and connected thereto. The first box 2a is then covered externally with a cartridge cover 31.

FIG. 12 is a perspective view showing another construction of connections between the first box 2a and the second box 2b. As shown in the figure, the first box 2a is inserted into the concave portion 25 formed in the second box 2b mounted in the personal computer main body 45. By pressing a push button 32 disposed on the personal computer main body 45, the first box 2a can be detached from the concave portion 25 of the second box 2b.

(Fifth embodiment)

Figure 13:
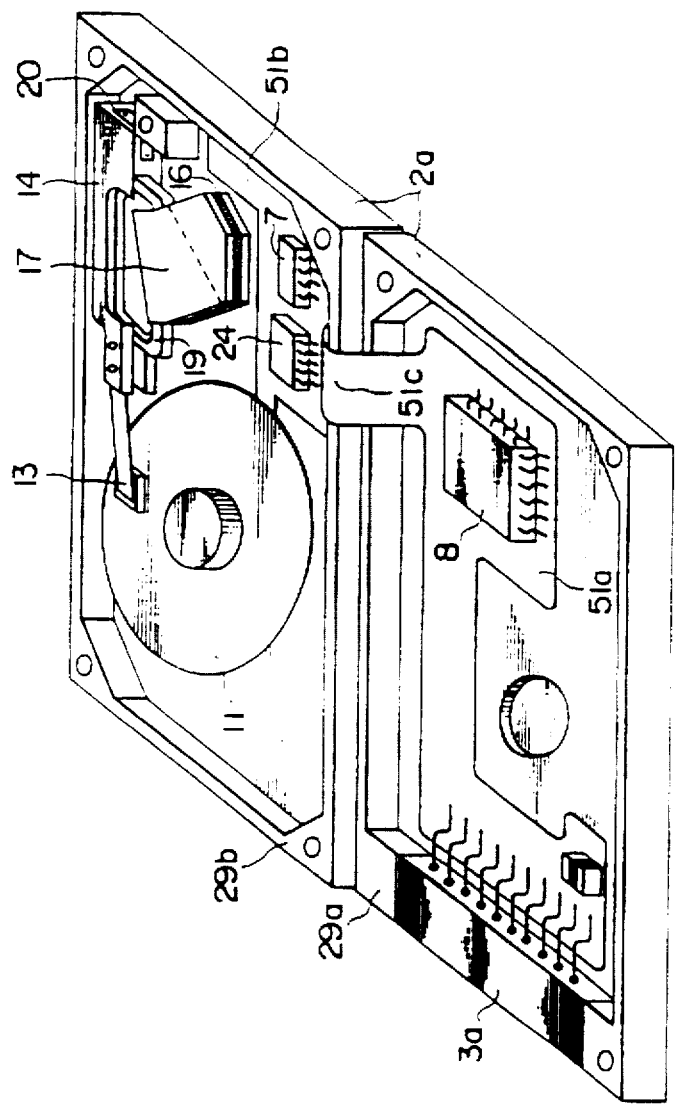
FIG. 13 is a perspective view showing an example of a cover side portion of a first box on which an electric circuit device is mounted in accordance with a fifth embodiment of the present invention.
Figure 14:
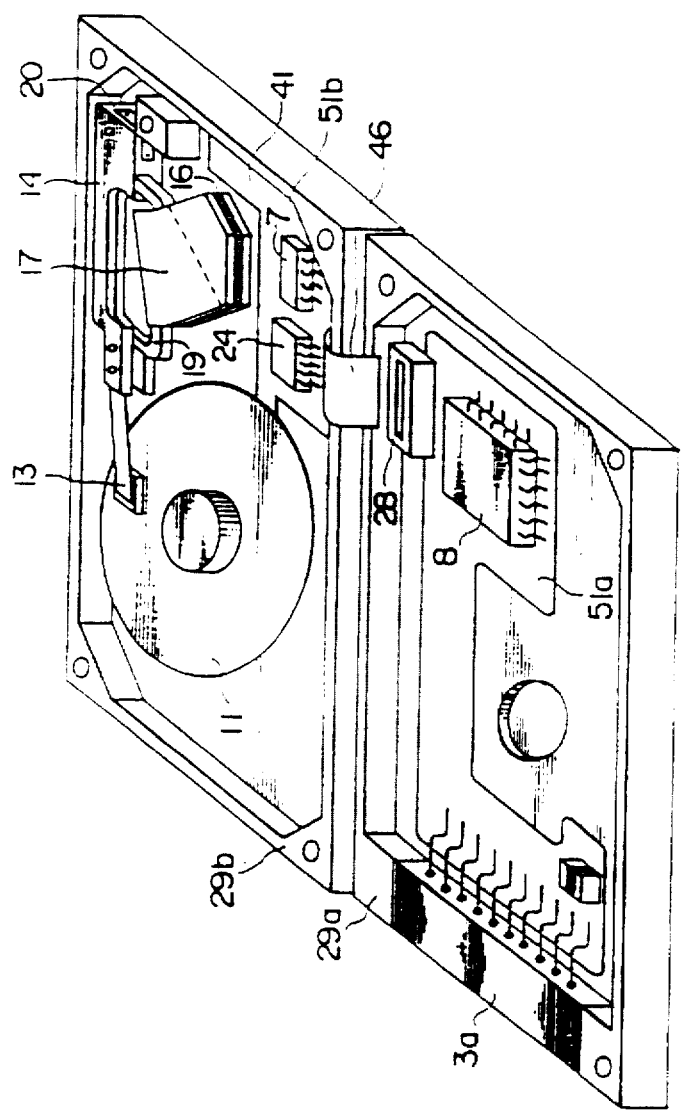
FIG. 14 is a perspective view showing another example of a cover side portion of the first box on which the electric circuit device is mounted in accordance with the fifth embodiment of the present invention.

With reference to FIGS. 13 and 14, a magnetic disk apparatus in accordance with a fifth embodiment of the present invention will be described. In FIGS. 13 and 14, the same portions as those in the first embodiment are designated by the same reference numerals, and their description will be omitted.

FIG. 13 is a perspective view of a first box 2a wherein an electric circuit device (mechanical portion driving circuit 8) is mounted in a cover side part 29a. In other words, the first box 2a is constructed of the cover side part 29a and a fixture side part 29b. A first mount part 51a made of an FPC (flexible print circuit) is bonded or screwed to the cover side portion 29a. The first mount part 51a is extended to the fixture side part 29b through a connection part 51c and connected to a second mount part 51b. The second mount part 51b is bonded or screwed to the fixture side part 29b.

The mechanical portion driving circuit 8 is mounted on the first mount part 51a secured to the cover side part 29a. The first mount part 51a is connected to a connector 3a mounted on the cover side portion 29a. On the other hand, an R/W amplifier 7 and a ROM 24 are mounted on the second mount part 51b secured to the fixture side part 29b. On a surface of the second mount part 51b, lead wires of component parts such as a spindle motor 12, magnetic heads 13, and a head actuator 14 are connected with solder or the like.

In this construction, the first connector 3a of the first box 2a can be easily connected to a second connector 2b of the second box 2b so as to easily exchange signals between the interior of the first box 2a and the interior of the second box 2b.

In addition, by crimping, connecting, or soldering pieces made of FPC (not shown in the figure) which have been mounted on the component parts 12, 13, and 14, the component parts can be connected to the second mount portion 51b.

According to this fifth embodiment, even if the electric circuits cannot be disposed two-dimensionally due to insufficient space for an IC device and wires of the printed wiring board, they can be easily disposed three-dimensionally. In addition, when a thin IC device is mounted on the FPC, the mounting space can be reduced. Moreover, when the mounting density is positively increased, the size of the first box can be further reduced.

FIG. 14 is a perspective view showing another embodiment wherein an electric circuit device (mechanical portion driving circuit 8) is mounted in a cover side portion 29a. In the embodiment shown in FIG. 14, a first mount part 51a is separated from a second mount part 51b. The construction of other parts of this embodiment is substantially the same as that of the embodiment shown in FIG. 13. More specifically, a connector 28 is connected to an end portion of the first mount part 51a of the cover side part 29a. A connecting piece 46 of the second mount part 51b of the fixture side part 29b is inserted into the connector 28.

In FIG. 14, the first mount part 51a electrically connected to the connector 28 with a Solder or the like is bonded or screwed to the cover side part 29a. On the other hand, the lead wires of the component parts such as the spindle motor 12, the magnetic heads 13, and the head actuator 14 are connected to the second mount part 51b secured to the fixture side part 29b. Thereafter, the connection piece 46 is connected to the connector 28. With the connector 28, the cover side part 29a and the fixture side part 29b can be independently and easily assembled. Thus, when a servo signal is written or the magnetic disk apparatus is assembled or produced, an improvement of working efficiency and a decrease in the product failure rate can be expected.

What is claimed is:

1. A magnetic disk apparatus comprising:

a magnetic disk;

a magnetic head for recording and reproducing information to and from said magnetic disk;

disk driving means for driving said magnetic disk;

head driving means for driving said magnetic head;

a mechanical portion driving circuit for operating said disk driving means and said head driving means;

an interface having a hard disk controller;

a logical operation circuit having a memory for storing position controlling information for controlling a position of said magnetic head, a channel circuit for converting a data signal from said hard disk controller into a data waveform for magnetic recording and for performing code processing of a data signal from said magnetic head, and a servo controller for supplying said position controlling information from said memory to said mechanical portion driving circuit;

a first group including at least said magnetic disk, said magnetic head, said disk driving means, said head driving means and a first connector, said first group being contained in a first containing portion; and a second group including at least said logical operation circuit and a second connector, said second group being contained in a second containing portion substantially separated from said first containing portion, wherein said first and second connectors are for electrically connecting said first and second groups and wherein said first and second containing portions are mechanically detachable from each other.

2. A magnetic disk apparatus as set forth in claim 1, wherein said mechanical portion driving circuit comprises a VCM (voice coil motor) driver and a motor driver, said VCM driver and said motor driver being contained in said first containing portion.

3. A magnetic disk apparatus as set forth in claim 1, wherein said mechanical portion driving circuit comprises a VCM (voice coil motor) driver and a motor driver, said VCM driver being contained in said second containing portion, said motor driver being contained in said first containing portion.

4. A magnetic disk apparatus as set forth in claim 1, wherein said mechanical portion driving circuit comprises a VCM (voice coil motor) driver and a motor driver, said VCM driver and said motor driver being contained in said-second containing portion.

5. A magnetic disk apparatus as set forth in claim 1, further comprising:

a ROM (read only memory) for storing information specific to the magnetic disk, the magnetic head, the disk driving means and the head driving means, said ROM being contained in the first containing portion.

6. A magnetic disk apparatus as set forth in claim 1, further comprising:

a ROM (read only memory) for storing information specific to the magnetic disk, the magnetic head, the disk driving means and the head driving means, said ROM being contained in the second containing portion.

7. An apparatus comprising:

a portable computer, said portable computer including a magnetic disk apparatus which includes a magnetic disk;

a magnetic head for recording and reproducing information to and from said magnetic disk;

disk driving means for driving said magnetic disk;

head driving means for driving said magnetic head;

a mechanical portion driving circuit for operating said disk driving means and said head driving means;

an interface having a hard disk controller;

a logical operation circuit having a memory for storing position controlling information for controlling a position of said magnetic head, a channel circuit for converting a data signal from said hard disk controller into a data waveform for magnetic recording and for performing code processing of a data signal from said magnetic head, and a servo controller for supplying said position controlling information from said memory to said mechanical portion driving circuit;

a first group including at least said magnetic disk, said magnetic head, said disk driving means, said head driving means and a first connector, said first group being contained in a first containing portion; and a second group including at least said logical operation circuit and a second connector, said second group being contained in a second containing portion substantially separated from said first containing portion, wherein said first and second connectors are for electrically connecting said first and second groups and wherein said first and second containing portions are mechanically detachable from each other.

* * * * *

UNITED STATES PATENT AND TRADEMARK OFFICE
CERTIFICATE OF CORRECTION

PATENT NO. : 5,739,995
DATED      : April 14, 1998
INVENTOR(S): Takao OHMI et al.

It is certified that error appears in the above-indentified patent and that said Letters Patent is hereby corrected as shown below:

On the title page,

[*] Notice: The portion of the term of this patent subsequent to [Oct. 25, 2011] April 2, 2012, has been disclaimed.

Signed and Sealed this

Sixteenth Day of March, 1999

Attest:

Attesting Officer

Q. TODD DICKINSON

Acting Commissioner of Patents and Trademarks